United States Patent
Shiau et al.

(10) Patent No.: US 12,056,279 B2
(45) Date of Patent: Aug. 6, 2024

(54) RAY CASTING SYSTEM AND METHOD

(71) Applicant: HTC Corporation, Taoyuan (TW)

(72) Inventors: Jia-Yau Shiau, Taoyuan (TW); Hsin-Yu Ho, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/489,856

(22) Filed: Oct. 19, 2023

(65) Prior Publication Data
US 2024/0134451 A1 Apr. 25, 2024
US 2024/0231488 A9 Jul. 11, 2024

Related U.S. Application Data

(60) Provisional application No. 63/417,707, filed on Oct. 20, 2022.

(51) Int. Cl.
*G06F 3/01* (2006.01)
*G06T 15/06* (2011.01)

(52) U.S. Cl.
CPC ............. *G06F 3/014* (2013.01); *G06T 15/06* (2013.01)

(58) Field of Classification Search
CPC ................................. G06F 3/014; G06T 15/06
See application file for complete search history.

(56) References Cited

U.S. PATENT DOCUMENTS

| | | | |
|---|---|---|---|
| 11,327,630 B1 * | 5/2022 | Khan | G06F 3/012 |
| 11,467,403 B2 * | 10/2022 | Chang | G02B 27/0093 |
| 11,610,376 B1 * | 3/2023 | Smith | G06F 3/011 |
| 11,978,169 B2 * | 5/2024 | Smith | G06F 3/011 |
| 2022/0057634 A1 * | 2/2022 | Chang | G06F 3/0346 |
| 2023/0326150 A1 * | 10/2023 | Smith | G06F 3/0482 |
| | | | 345/105 |
| 2023/0367402 A1 * | 11/2023 | Ikeda | G06F 3/0346 |
| 2023/0368483 A1 * | 11/2023 | Nakamura | G06T 19/20 |
| 2024/0053832 A1 * | 2/2024 | Ikeda | G06F 3/04842 |
| 2024/0103629 A1 * | 3/2024 | Nabeshima | G06F 3/011 |
| 2024/0135665 A1 * | 4/2024 | Ikeda | H04N 13/398 |

* cited by examiner

*Primary Examiner* — Michael Pervan
(74) *Attorney, Agent, or Firm* — JCIPRNET

(57) ABSTRACT

A ray casting system is provided. The ray casting system include a display, a camera, an interactive sensor, and a processor. The display is configured to display a virtual environment. The camera is configured to obtain a hand image including a hand of the user. The interactive sensor is configured to obtain a user instruction from the user, wherein the interactive sensor is adapted to be mounted on the hand of the user. The processor is configured to generate a control ray in the virtual environment based on the hand image and apply a displacement to the control ray based on the user instruction.

20 Claims, 5 Drawing Sheets

RAY CASTING SYSTEM AND METHOD

CROSS-REFERENCE TO RELATED APPLICATION

This application claims the priority benefit of U.S. provisional application Ser. No. 63/417,707, filed on Oct. 20, 2022. The entirety of the above-mentioned patent application is hereby incorporated by reference herein and made a part of this specification.

BACKGROUND

Technical Field

The disclosure relates to a ray casting system; particularly, the disclosure relates to a ray casting system and a ray casting method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a ray casting system and a ray casting method, so as to improve convenience and accuracy of ray casting.

In this disclosure, a ray casting system is provided. The ray casting system include a display, a camera, an interactive sensor, and a processor. The display is configured to display a virtual environment. The camera is configured to obtain a hand image including a hand of the user. The interactive sensor is configured to obtain a user instruction from the user, wherein the interactive sensor is adapted to be mounted on the hand of the user. The processor is configured to generate a control ray in the virtual environment based on the hand image and apply a displacement to the control ray based on the user instruction.

In this disclosure, a ray casting method is provided. The ray casting method includes: displaying a virtual environment; obtaining a hand image including a hand of the user; generating a control ray in the virtual environment based on the hand image; obtaining a user instruction from the user through an interactive sensor, wherein the interactive sensor is adapted to be mounted on the hand of the user; and applying a displacement to the control ray based on the user instruction.

Based on the above, according to the ray cast system and the ray casting method, the convenience and the accuracy of the ray casting are improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
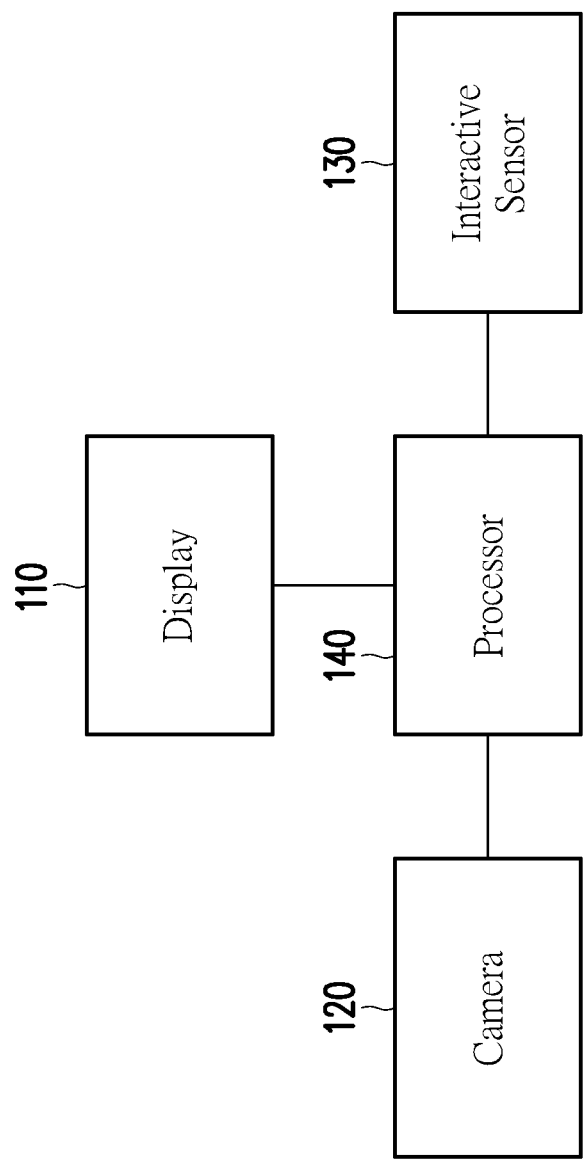
FIG. 1 is a schematic diagram of a ray casting system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ". The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements.

Ray casting is a technology that allows users to interact with objects in the XR environment. It works by tracing rays from the user into the scene and then determining what objects the rays intersect with. In one embodiment, a ray may be generated and controlled by detecting hand gestures using hand tracking. By tracking the position and orientation of the user's hands, an interaction with virtual objects may be performed. However, sometimes the result of the hand tracking may not be as accurate as the user expected or may cause latency issues. In another embodiment, a ray may be generated and controlled by a controller hold by the hand of the user. By using the controller to control the ray, the user may be able to control the ray with great precision. However, while the user is holding the controller, the actions the user can do may be limited. Therefore, it is the pursuit of people skilled in the art to provide an accurate and convenient way to perform the ray casting.

FIG. 1 is a schematic diagram of a ray casting system according to an embodiment of the disclosure. With reference to FIG. 1, a ray casting system may include a display 110, a camera 120, an interactive sensor 130, and a processor 140. However, this disclosure is not limited thereto.

The display 110 may be configured to display a virtual environment. The camera 120 may be configured to obtain a hand image including a hand of the user. The interactive sensor 130 may be configured to obtain a user instruction from the user. Moreover, the interactive sensor 130 may be adapted to be mounted on the hand of the user. The processor 140 may be configured to generate a control ray in the virtual environment based on the hand image. For example, a hand pose or a gesture of the hand may be identified based on the hand image and the control ray may be generated based on the hand pose or the gesture. Further, the processor 140 may be configured to apply a displacement to the control ray based on the user instruction.

In this manner, the control ray generated based on the hand pose of the hand image may be fine-tuned by the displacement. Further, since the interactive sensor 130 is mounted on the same hand for generating the control ray, the user may be able to control the control ray with great precision and still be able to perform all kinds of actions or gestures at the same time.

In one embodiment, the display 110 may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, the disclosure is not limited thereto.

In one embodiment, the camera 120 may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. However, the disclosure is not limited thereto.

In one embodiment, the interactive sensor 130 may include, for example, an optical sensor (e.g., an optical finger navigation (OFN) sensor), an ultrasound sensor, a proximity sensor, a touch panel, a trackball, an inertial measurement unit, or other similar device suitable for collecting data from the user. However, the disclosure is not limited thereto.

In one embodiment, the processor 140 may include, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 140 may be achieved as multiple program codes. The program codes are stored in a memory, and executed by the processor 140. Alternatively, in an embodiment, each of the functions of the processor 140 may be achieved as one or more circuits. The disclosure does not limit the use of software or hardware to achieve the functions of the processor 140.

In one embodiment, the display 110, the camera 120, and the processor 140 may be integrated to a single device, such as a head-mounted display (HMD), wearable glasses (e.g., AR/VR goggles), a tablet, a smartphone, a projector, a laptop, other similar devices adapted for XR or other reality related technologies, or a combination of these devices. Alternatively, the display 110, the camera 120, and the processor 140 may be on separate devices. Moreover, the interactive sensor 130 may be part of an edge device and the edge device is adapted to be mounted on the hand (e.g., finger or wrist) of the user. However, the disclosure is not limited thereto.

In one embodiment, each of the display 110, the camera 120, the interactive sensor 130 and the processor 140 may include a network module and the network module may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the display 110, the camera 120, the interactive sensor 130 and the processor 140 may be configured to communicate with the each other through either wired communication or wireless communication.

Figure 2:
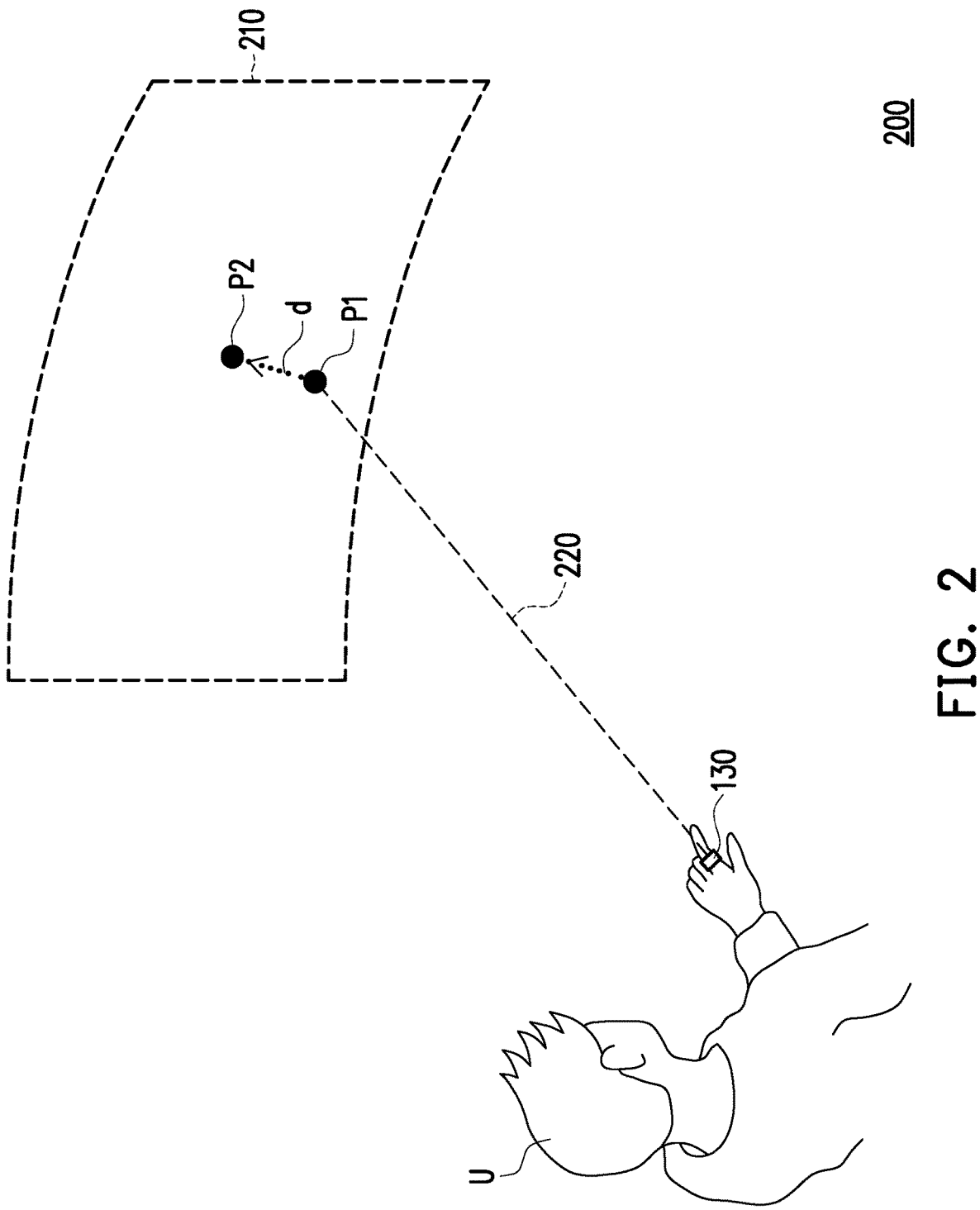
FIG. 2 is a schematic diagram of a ray casting scenario according to an embodiment of the disclosure.

FIG. 2 is a schematic diagram of a ray casting scenario according to an embodiment of the disclosure. With reference to FIG. 1 and FIG. 2, a ray casting scenario 200 may include a user U, a field of view (FOV) 210 of the user U in the virtual environment. The interactive sensor 130 may be mounted on a hand of the user U and a control ray 220 may be generated based on the hand pose of the hand of the user U through the camera 120 (not shown). It is noted that, for the sake of convenience in explanation that the display 110, the camera 120, and the processor 140 are not depicted in the ray casting scenario 200 and the interactive sensor 130 is mounted on an index finger of the user U. However, this disclosure is not limited thereto.

In one embodiment, the control ray 220 may be generated utilizing a hand tracking algorithm. To be more specific, the processor 140 may be configured to perform a hand tracking of the hand of the user U based on the hand image obtained by the camera 120. Then the processor 140 may be configured to generate the control ray 220 based on a tracking result of the hand tracking. Therefore, a direction and an angle of the control ray 220 may be determined and reflect a hand pose (gesture) of the hand of the user U.

In one embodiment, the interactive sensor 130 may be included in an edge device, such as a ring device, and the edge device may be adapted to be worn on a finger of the user U. That is, the interactive sensor 130 may be adapted to be mounted on a first finger (e.g., one of the index finger, middle finger, ring finger, little finger) of the hand of the user U. Further, the interactive sensor 130 may be configured to obtain sensor data from a second finger (e.g., thumb) to generate the user instruction, e.g., by clicking or long pressing. For example, the sensor data may be directly used as the user instruction or the sensor data may be processed (e.g., filtering the noise) to generate the user instruction.

Based on the user instruction, a displacement d may be applied to the control ray 220 in the virtual environment. For example, the control ray 220 may originally point to a first point P1 in the FOV 210 of the user U in the virtual environment. However, the user U may actually intend to make the control ray 220 pointing to a second point P2. That is, the control ray 220 is casting to a wrong position due to one of potential issues, such as hand tracking blocked by an obstacle, dirt on lens of the camera 120 . . . etc. In order to correct the casting of the control ray 220, the user U may provide the user instruction through the interactive sensor 130 to generate the displacement d. By applying the displacement d to the control ray 220, an intersection of the control ray 220 and the FOV 210 may be shifted from the first point P1 to the second point P2. That is, the processor 140 may be configured to move the control ray 220 (specifically, the intersection of the control ray 220 and the FOV 210) from the first point P1 to the second point P2 by applying the displacement d. In this manner, the user U may be able to control the control ray 220 with great precision and still be able to perform all kinds of actions or gestures at the same time.

In addition, an area of the FOV 210 of the user U in the virtual environment may be different due to a size of the display 110 or a setting of an application. In the case of the area of the FOV 210 being too huge, when the user U wants to move the control ray 220 from one boundary to another boundary, the user U may need to provide the user instruction more than one time. In the case of the area of the FOV 210 being too small, when the user U wants to move the control ray 220 from one boundary to another boundary, the user U may not be able to give a precise user instruction.

Therefore, a scaling factor may be necessary to adjust a sensitivity of the interactive sensor 130 or adjust the sensor data from the interactive sensor 130. That is, the processor 140 may be configured to multiply the user instruction by the scaling factor to generate the displacement d. Further, the processor 140 may be configured to determine the scaling factor based on (an area of) the FOV 210 of the user U in the virtual environment. On the other hand, processor 140 may be configured to determine the scaling factor according to a preferred value set by the user U. In this manner, no matter the area of the FOV 210 is huge or small, the user U may be still able to control the control ray 220 with great precision.

Figure 3B:
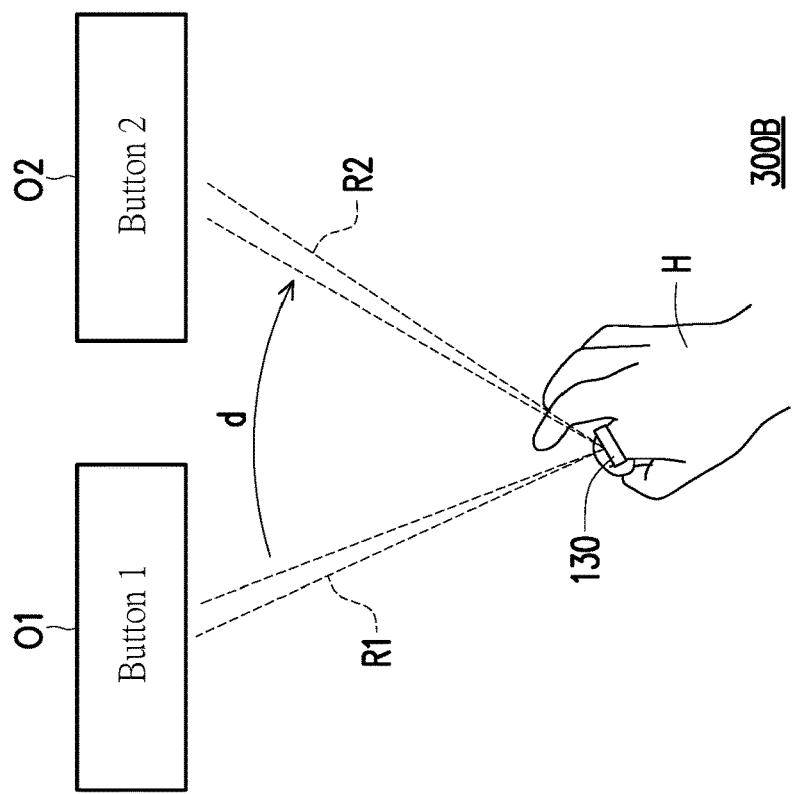
FIG. 3B is a schematic diagram of a ray casting scenario according to an embodiment of the disclosure.
Figure 3A:
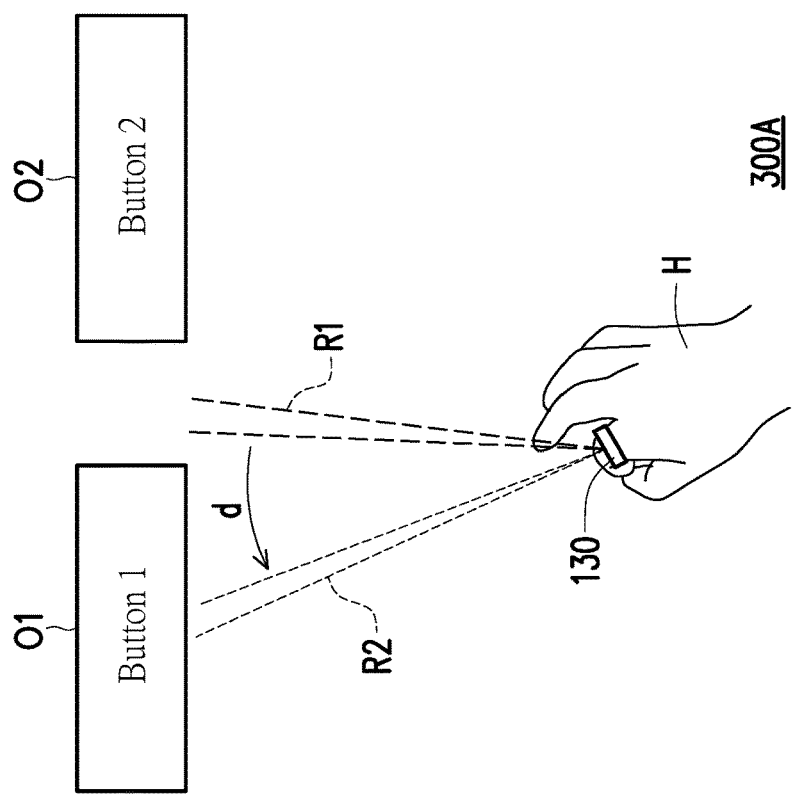
FIG. 3A is a schematic diagram of a ray casting scenario according to an embodiment of the disclosure.

FIG. 3A is a schematic diagram of a ray casting scenario according to an embodiment of the disclosure. With reference to FIG. 1 to FIG. 3A, a ray casting scenario 300A includes a hand H of the user U, a first object O1 and a second object O2.

Referring to FIG. 3A, based on the hand pose of the hand image, a first ray R1 in the virtual environment may be generated and the first ray R1 may be pointing between the first object O1 and the second object O2, while the user U may actually intend to point to the first object O1. At this time, the user U may provide the user instruction through the interactive sensor 130 and a displacement d may be applied to the first ray R1 based on the displacement d. By applying the displacement d, the first ray R1 may become a second ray R2 and the second ray R2 may be pointing to the first object O1. That is, the processor 140 may be configure to move the control ray 220 from an original point (e.g., a point between the first object O1 and the second object O2) to an intention point (e.g., a point on the first object O1) by applying the displacement d. In other words, the intention point is a point that the user U intends to point. In this manner, the user U may be able to control the control ray 220 with great precision.

FIG. 3B is a schematic diagram of a ray casting scenario according to an embodiment of the disclosure. With reference to FIG. 1 to FIG. 3B, a ray casting scenario 300B includes a hand H of the user U, a first object O1 and a second object O2.

In one embodiment, instead of moving the control ray 220 from the first point P1 to the second point P2 to correct the ray casting by applying the displacement d, the control ray 220 may be moved from the first object O1 to the second object O2 by applying the displacement d. For example, the first object O1 may be a button 1 and the second object O2 may be a button 2. However, this disclosure is not limited thereto.

Referring to FIG. 3B, based on the hand pose of the hand image, a first ray R1 in the virtual environment may be generated and the first ray R1 may be pointing at the first object O1, while the user U may actually intend to point to the second object O2. At this time, the user U may provide the user instruction through the interactive sensor 130 and a displacement d may be applied to the first ray R1 based on the displacement d. By applying the displacement d, the first ray R1 may become a second ray R2 and the second ray R2 may be pointing to the second object O2. That is, the processor 140 may be configure to move the control ray 220 from the first object O1 to the second object O2 by applying the displacement d. In this manner, the user U may be able to control the control ray 220 with great precision.

Figure 4:
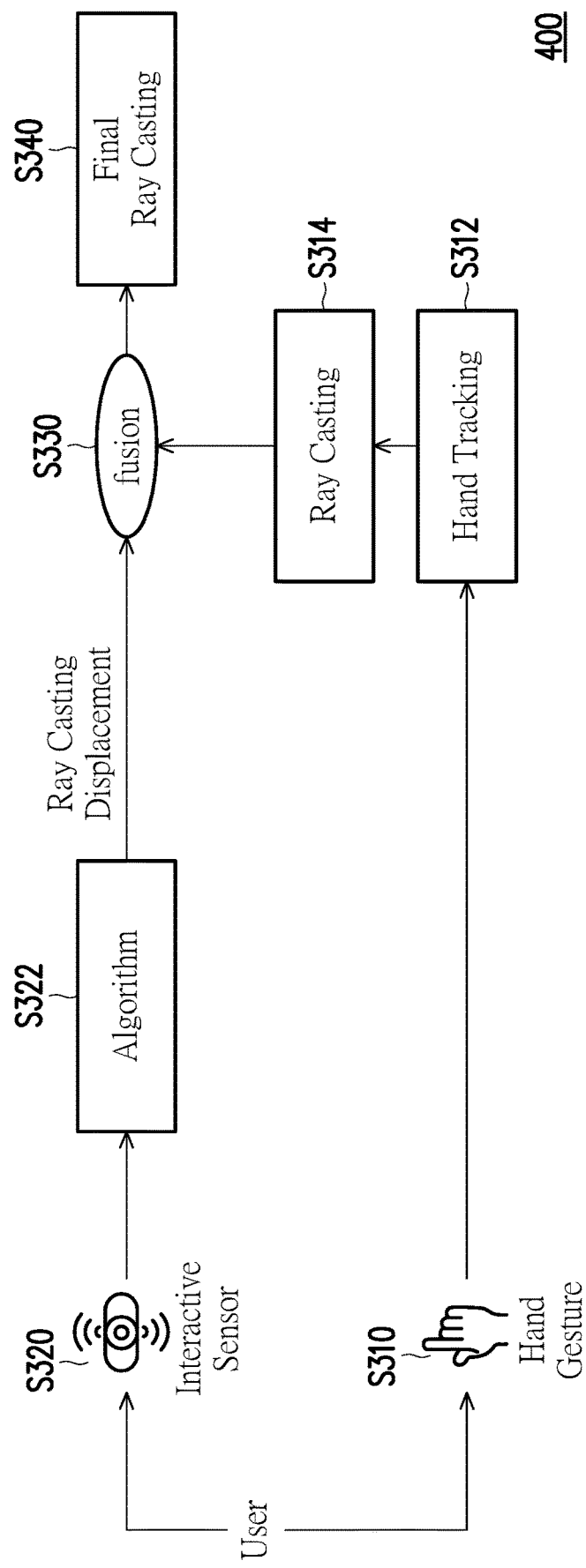
FIG. 4 is a schematic diagram of a system architecture of a ray casting system according to an embodiment of the disclosure.

FIG. 4 is a schematic diagram of a system architecture of a ray casting system according to an embodiment of the disclosure. With reference to FIG. 1 and FIG. 4, a system architecture 400 may be one exemplary system architecture of the ray casting system 100.

In a step S310, the user U may perform a hand gesture and the hand gesture may be captured by the camera 120 to generate the hand image. In a step S312, based on the hand image, a hand tracking may be performed to generate a tracking result. The tracking result may include the hand gesture and/or an angle and a direction of the hand or the wrist of the user U. In a step S314, a ray casting may be performed based on the tracking result of the hand tracking. For example, an angle and/or a direction of the control ray 220 may be determined based on the angle and/or the direction of the hand or the wrist. In addition, the hand gesture may be identified at the same time during the ray casting. That is, the user U may still able to perform all kinds of gesture to perform an operation in the virtual environment during the ray casting. In other words, the processor 140 may be configured to generate the control ray 220 and perform an operation (related or not related to the control ray 220) based on the hand pose of the hand image simultaneously.

In a step S320, the interactive sensor 130 may collect sensor data from the user U. In a step S322, an algorithm may be performed to process the sensor data obtained by the interactive sensor 130. The algorithm may include but not limited to: noise cancellation, signal amplification, applying the scaling factor, or other data processing according to design needs. After the sensor data being processed, a ray casting displacement (e.g., the user instruction or the displacement d) may be generated.

In a step S330, a fusion operation may be performed to fuse the control ray 220 with the ray casting displacement. After the fusion, the control ray 220 may be shifted or moved based on the ray casting displacement. In a step S340, a final ray casting may be performed to displayed the control ray 220 in the virtual environment to the user U. In this manner, the user U may be able to control the control ray 220 with great precision and still be able to perform all kinds of actions or gestures at the same time.

Figure 5:
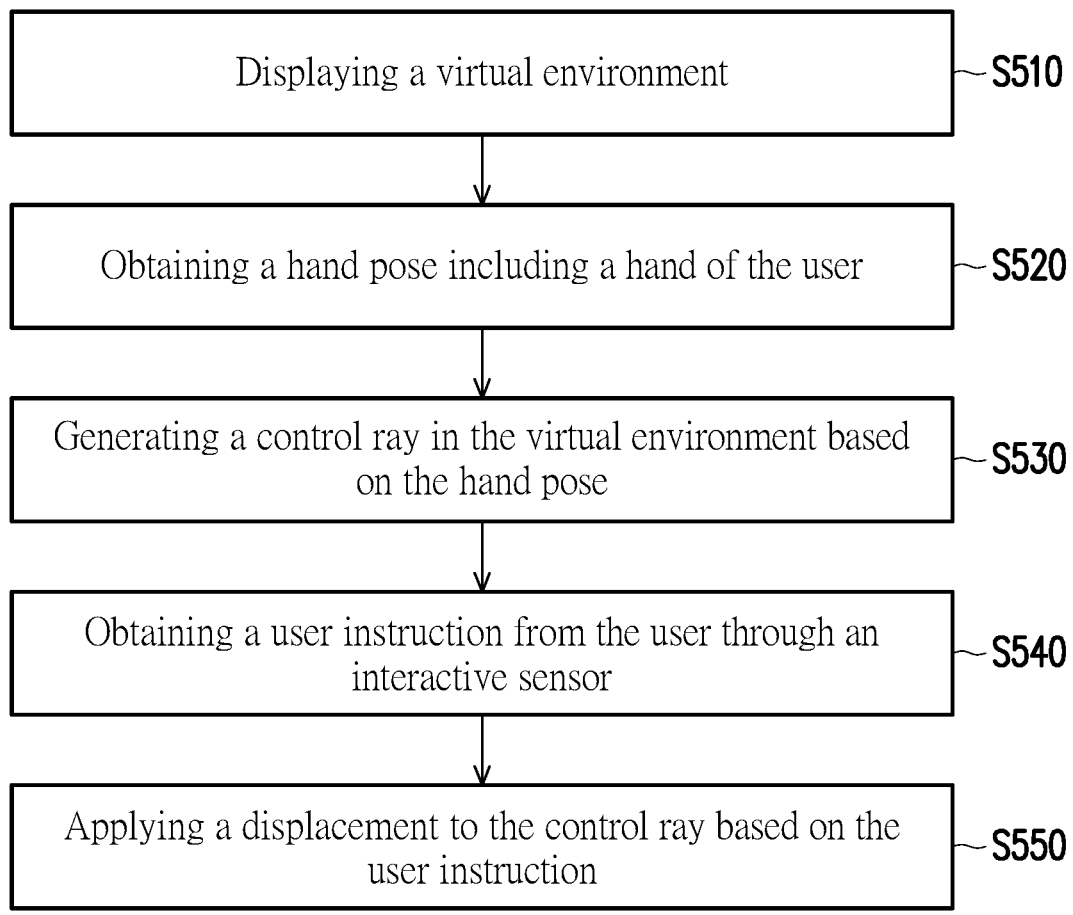
FIG. 5 is a schematic flowchart of a ray casting method according to an embodiment of the disclosure.

FIG. 5 is a schematic flowchart of a ray casting method according to an embodiment of the disclosure. With reference to FIG. 1, FIG. 2 and FIG. 5, a ray casting method 500 may include a step S510 to a step S550.

In the step S510, a virtual environment may be displayed by the display 110. In a step S520, a hand image of a hand H of the user U may be obtained by the camera 120. In one embodiment, a hand pose may be further obtained by the processor 140 based on the hand image. In a step S530, the control ray 220 in the virtual environment may be generated based on (the hand pose of) the hand image. In a step S540, a user instruction from the user U may be obtained through the interactive sensor 130. In the step S550, a displacement d may be applied to the control ray 220 based on the user instruction.

In addition, the implementation details of the ray casting method 500 may be referred to the descriptions of FIG. 1 to FIG. 4 to obtain sufficient teachings, suggestions, and implementation embodiments, while the details are not redundantly described seriatim herein.

In summary, according to the ray casting system 100 and the ray casting method 400, since the interactive sensor 130 is mounted on the same hand for generating the control ray 220, the user U may be able to control the control ray 220 with great precision and still be able to perform all kinds of actions or gestures at the same time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A ray casting system, comprising:
    a display, configured to display a virtual environment;
    a camera, configured to obtain a hand image including a hand of the user;
    an interactive sensor, configured to obtain a user instruction from the user, wherein the interactive sensor is adapted to be mounted on the hand of the user; and
    a processor, configured to:
        generate a control ray in the virtual environment based on the hand image; and
        apply a displacement to the control ray based on the user instruction.

2. The ray casting system according to claim 1, wherein the processor is further configured to:
    perform a hand tracking of the hand based on the hand image; and
    generate the control ray based on a tracking result of the hand tracking.

3. The ray casting system according to claim 1, wherein the interactive sensor is adapted to be mounted on a first finger of the hand and configured to obtain sensor data from a second finger of the hand to generate the user instruction.

4. The ray casting system according to claim 1, wherein the processor is further configured to:
    move the control ray from a first point to a second point by applying the displacement.

5. The ray casting system according to claim 1, wherein the processor is further configured to:
    move the control ray from an original point to an intention point by applying the displacement, wherein the intention point is a point that the user intends to point.

6. The ray casting system according to claim 1, wherein the processor is further configured to:
    multiply the user instruction by a scaling factor to generate the displacement.

7. The ray casting system according to claim 6, wherein the processor is further configured to:
    determine the scaling factor based on a field of view of the user in the virtual environment.

8. The ray casting system according to claim 6, wherein the processor is further configured to:
    determine the scaling factor according to a preferred value set by the user.

9. The ray casting system according to claim 1, wherein the processor is further configured to:
    generate the control ray and perform an operation based on the hand image simultaneously.

10. The ray casting system according to claim 1, wherein the interactive sensor is an optical sensor, an ultrasound sensor, a proximity sensor, a touch panel, a trackball, or an inertial measurement unit.

11. A ray casting method, comprising:
    displaying a virtual environment;
    obtaining a hand image including a hand of the user;
    generating a control ray in the virtual environment based on the hand image;
    obtaining a user instruction from the user through an interactive sensor, wherein the interactive sensor is adapted to be mounted on the hand of the user; and
    applying a displacement to the control ray based on the user instruction.

12. The ray casting method according to claim 11, further comprising:
    performing a hand tracking of the hand based on the hand image; and
    generating the control ray based on a tracking result of the hand tracking.

13. The ray casting method according to claim 11, wherein
    the interactive sensor is adapted to be mounted on a first finger of the hand and configured to obtain sensor data from a second finger of the hand to generate the user instruction.

14. The ray casting method according to claim 11, further comprising:
    moving the control ray from a first point to a second point by applying the displacement.

15. The ray casting method according to claim 11, further comprising:
    moving the control ray from an original point to an intention point by applying the displacement, wherein the intention point is a point that the user intends to point.

16. The ray casting method according to claim 11, further comprising:
    multiplying the user instruction by a scaling factor to generate the displacement.

17. The ray casting method according to claim 16, further comprising:
    determining the scaling factor based on a field of view of the user in the virtual environment.

18. The ray casting method according to claim 16, further comprising:
    determining the scaling factor according to a preferred value set by the user.

19. The ray casting method according to claim 11, further comprising:
    generating the control ray and perform an operation based on the hand image simultaneously.

20. The ray casting method according to claim 11, wherein
    the interactive sensor is an optical sensor, an ultrasound sensor, a proximity sensor, a touch panel, a trackball, or an inertial measurement unit and configured to obtain sensor data as the user instruction.

* * * * *